United States Patent
Lam et al.

(10) Patent No.: US 7,155,585 B2
(45) Date of Patent: Dec. 26, 2006

(54) METHOD AND SYSTEM FOR SYNCHRONIZING STORAGE SYSTEM DATA

(75) Inventors: Wai Lam, Jericho, NY (US); Ronald S. Niles, Teaneck, NJ (US); Xiaowei Li, Hauppauge, NY (US)

(73) Assignee: Falconstor Software, Inc., Melville, NY (US)

( * ) Notice: Subject to any disclaimer, the term of this patent is extended or adjusted under 35 U.S.C. 154(b) by 409 days.

(21) Appl. No.: 10/633,344

(22) Filed: Aug. 1, 2003

(65) Prior Publication Data

US 2005/0027955 A1    Feb. 3, 2005

(51) Int. Cl.
*G06F 12/00*    (2006.01)
*G06F 13/00*    (2006.01)

(52) U.S. Cl. .................. 711/162; 711/100; 711/154; 711/161

(58) Field of Classification Search ............... 711/100, 711/154, 161, 162
See application file for complete search history.

(56) References Cited

U.S. PATENT DOCUMENTS

| | | | |
|---|---|---|---|
| 4,734,856 A * | 3/1988 | Davis | ............... 706/62 |
| 5,649,196 A | 7/1997 | Woodhill et al. | |
| 6,085,298 A | 7/2000 | Ohran | |
| 6,865,567 B1 * | 3/2005 | Oommen et al. | ............... 707/2 |

* cited by examiner

*Primary Examiner*—Tuan V. Thai
(74) *Attorney, Agent, or Firm*—Jonathan Tyler; Kaye Scholer LLP

(57) ABSTRACT

A method and system are provided for comparing data stored in a first storage system with corresponding data stored in a second storage system. In one implementation, the first system generates a random value associated with a respective data block P, and transmits to the second system an identifier associated with the data block P, and the random value. The second system generates a first digest representing a data block B, uses the first digest to encode the random value, producing a first encoded value, and transmits the first encoded value to the first system. The first system generates a second digest representing the data block P, uses the second digest to encode the random value, producing a second encoded value, and compares the first and second encoded values. If the two encoded values are equal, the data block B is a duplicate of the data block P. If the two encoded values are not the same, the data blocks are different. Additionally, a method is provided for synchronizing data stored on a second system to data stored on a first system. In one implementation, a data block P stored on a first system is compared to a data block B stored on a second system, as described above. If the two data blocks are different, the first system transmits a copy of the data block P, and the second system stores the copied data block P.

84 Claims, 8 Drawing Sheets

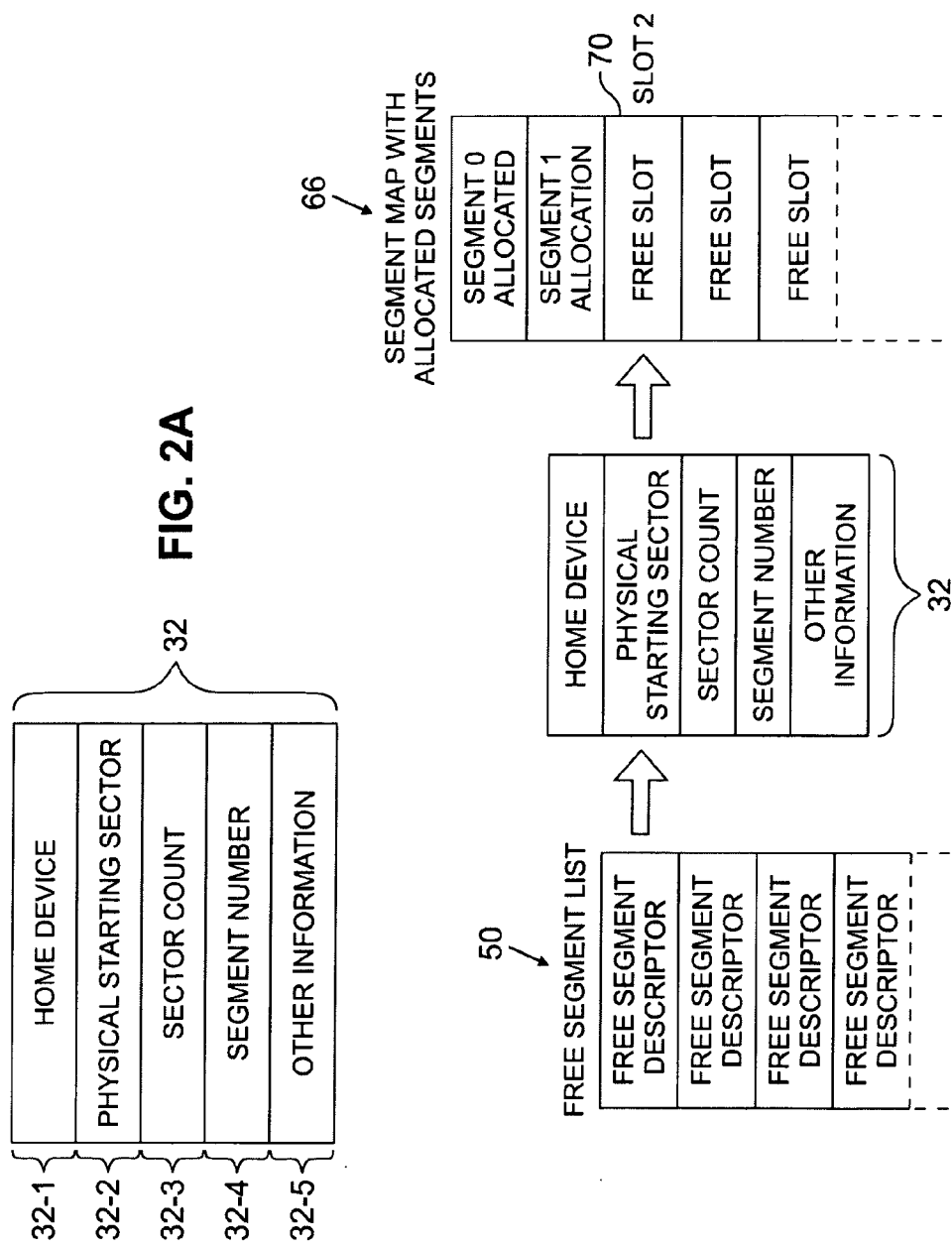

620

| BLOCK IDENTIFIER (630) | ENCODED VALUE $V_B$ (635) | ENCODED VALUE $V_P$ (640) |
|---|---|---|
| Q-74 | $V_B$-1 | $V_P$-1 |
| Q-131 | $V_B$-2 | $V_P$-2 |
| M-14 | $V_B$-3 | $V_P$-3 |

662-1, 662-2, 662-3

METHOD AND SYSTEM FOR SYNCHRONIZING STORAGE SYSTEM DATA

BACKGROUND OF THE INVENTION

1. Field of the Invention

The invention relates generally to a system and method for storing data, and more particularly, to a method and system for comparing data stored on a first storage system to corresponding data stored on a second storage system.

2. Description of the Related Art

In many computing environments, large amounts of data are written to and retrieved from storage devices connected to one or more computers. As more data is stored on and accessed from storage devices, it becomes increasingly difficult to reproduce data if the storage devices fail. One way of protecting data is by backing up the data to backup media (e.g., tapes or disks). The backup media may then be stored in a safe location.

Other techniques for backing up data require comparing a block of data stored on a backup storage device to a corresponding data block on a primary storage device. If, for example, asynchronous mirroring is used to generate a backup copy of data—e.g., a cache is used to temporarily store data written to the primary device before writing to the backup, or mirroring, device—an interruption in the communication between the cache and the mirroring device can cause data to be lost and the backup copy to become corrupted. Generally, in such case, it is necessary to synchronize the mirroring device with the primary device, i.e., ensure that each sector of data on the backup device is identical to the corresponding sector on the primary device, before storing additional data.

One method for reconciling data on the backup storage device with the data stored on the primary storage device is to compare each block of data on the backup device with the corresponding block of data on the primary device. This requires either transferring each data block from the backup device to the primary device or transferring each data block from the primary device to the backup device. In some cases this may be an adequate solution. However, this approach typically requires a large bandwidth over the communications link between the two devices. This method can also be unacceptably slow. If the backup device is located at a remote location, these problems may be exacerbated. If a large amount of data is involved, it is often necessary to utilize a high-speed communication link between the primary device and the remote site where the backup device is located. Because high speed communication links are typically expensive, this solution is often undesirable.

This approach additionally poses security risks. Whenever a block of data is transmitted over the communication link, a third party may have an opportunity to intercept the data. The third party may intercept the data for espionage purposes, sabotage purposes, etc.

Techniques have been developed to reduce both the bandwidth requirements and the time needed to synchronize data between primary and backup storage devices. One approach is to identify and flag blocks of data on the backup device that are inconsistent with the corresponding data blocks on the primary device, and copy from the primary device to the backup device only the flagged data blocks. In accordance with one such technique, the backup device uses a known function to generate, for a respective data block, a first digest that represents the contents of the data block, and transmits the first digest to the primary device. The primary device retrieves a corresponding block of data and uses the same function to generate a second digest. The primary device then compares the first digest to the second digest. If the digests match, then the data blocks stored in the corresponding storage locations are assumed to be duplicates of one another. If the digests are not the same, then the data blocks stored in the corresponding storage locations are different. If the data blocks are different, the data block from the primary device is transmitted over the communication link to the backup device.

To be practical, a digest should be substantially smaller in size than the data block. Ideally, each digest is uniquely associated with the respective data block from which it is derived. Any one of a wide variety of functions can be used to generate a digest. Cryptographically strong hash functions are often used for this purpose. Another well-known function is the cyclic redundancy check (CRC). A digest-generating function is referred to herein as a D-G function.

A D-G function which generates a unique digest for each data block is said to be "collision-free." In practice, it is sometimes acceptable to implement a D-G function that is substantially, but less than 100%, collision free.

Although this technique significantly reduces the amount of data that must be transmitted in order to synchronize two storage volumes, it does not entirely resolve the security problem. If the D-G function employed in the process is reversible, a third party may intercept the digest and derive the data block from the digest. Even if the D-G function is irreversible, a party familiar with the synchronization operation may intercept the digest, alter data in one or more of the storage systems, and in a subsequent synchronization operation retransmit the intercepted digest at the appropriate moment, thereby concealing the altered data.

SUMMARY OF THE INVENTION

Accordingly, there is a need for comparing data stored in a first storage system with corresponding data stored in a second storage system without transferring the data from one storage system to the other. There is additionally a need for comparing data stored in a first storage system with corresponding data stored in a second storage system without transmitting the actual data across the communication link between the two systems.

The present method and system provide for comparing data stored in a first storage system with corresponding data stored in a second storage system. In accordance with one implementation of the invention, the first storage system retrieves a data block P, and generates a random value associated with the data block P. The first system transmits to the second system an identifier associated with the data block P, and the random value. The second system retrieves a data block B that corresponds to the data block P (based upon the associated identifier), and generates a first digest that represents the data block B. The second system then uses the first digest to encode the random value, producing a first encoded value. The second system then transmits the first encoded value to the first system. The first system, in a similar manner, generates a second digest that represents the data block P, and uses the second digest to encode the random value to produce a second encoded value. The first system then compares the first encoded value to the second encoded value. If the first and second encoded values are equivalent, the data block B is a duplicate of the data block P. If the first encoded value is not the same as the second encoded value, the data block B is different from the data block P.

There is a further need for synchronizing data stored on a first storage system with data stored on a second storage system while minimizing the quantity of data transferred from one storage system to the other.

The present method and system provide for synchronizing data stored on a second storage system to data stored on a first storage system. In accordance with one implementation of the invention, the steps outlined above are carried out to compare a data block P stored on a first storage system with a data block B stored on a second storage system. If the data block B is different from the data block P, the first system transmits a copy of the data block P, and the second system stores the copy of the data block P received from the first system.

BRIEF DESCRIPTION OF THE DRAWINGS

These and other features and advantages of the invention will be apparent to those skilled in the art from the following detailed description of preferred embodiments, taken together with the accompanying drawings, in which:

FIG. 2A illustrates schematically the contents of a segment descriptor;

FIG. 2B illustrates a free segment list, a segment descriptor, and a segment map used to manage data in accordance with a dynamic disk space allocation technique;

DETAILED DESCRIPTION OF THE PREFERRED EMBODIMENTS

Figure 1:
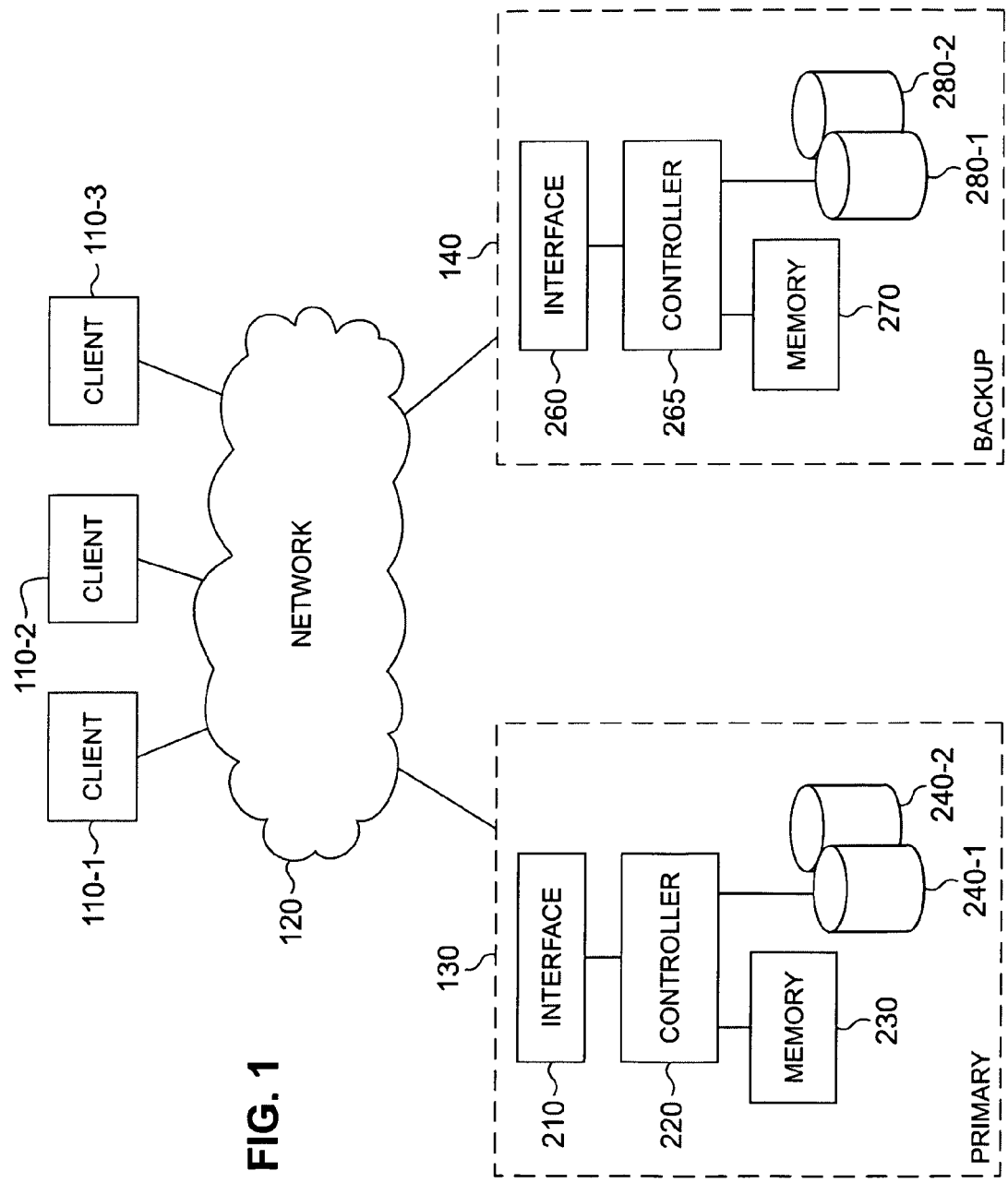
FIG. 1 illustrates a system for backing up data in accordance with one implementation of the invention.

FIG. 1 illustrates a system for backing up data in accordance with one aspect of the invention. Primary storage system 130 and backup storage system 140 are connected to network 120. Network 120 may be implemented as one or more of a number of different types of networks, such as, for example, an intranet, a local area network (LAN), a wide area network (WAN), an internet, Fibre Channel-based storage area network (SAN) or Ethernet. Alternatively, network 120 may be implemented as a combination of different types of networks. Any number of computers (three of which, 110, 111 and 112 are shown in FIG. 1) may be connected to primary system 130 and backup system 140 over network 120.

Primary storage system 130 may be implemented by any storage mechanism that stores data and is capable of being backed up in accordance with the present invention. In the implementation shown in FIG. 1, primary storage system 130 comprises controller 220, memory 230, interface 210 and storage devices 240-1 and 240-2. Controller 220 orchestrates the operations of primary storage system 130, including processing input/output (I/O) requests from network 120, and sending I/O commands to storage devices 240. In one implementation, controller 220 is implemented by a software application. In an alternative implementation, controller 220 is implemented by a combination of software and digital or analog circuitry.

Communications between controller 220 and network 120 are conducted in accordance with IP or Fibre Channel protocols. Accordingly, controller 220 receives from network 120 data processing requests formatted according to IP or Fibre Channel protocols.

Memory 230 is used by controller 220 to manage the flow of data to and from, and the location of data on, storage devices 240. For example, controller 220 may store various tables indicating the locations and types of various items of data stored in storage devices 240.

Interface 210 provides a communication gateway through which data may be transmitted between primary storage system 130 and network 120. Interface 210 may be implemented using a number of different mechanisms, such as one or more SCSI cards, enterprise systems connection cards, fiber channel interfaces, modems, network interfaces, or a network hub.

Storage devices 240 may be implemented by any type of storage device that allows block-level storage access. In one implementation, storage devices 240 are disk drives. A disk drive typically includes one or more disks having a medium upon which information may be written. Each disk includes a number of physical tracks, each of which, in turn, is divided into one or more physical blocks. Accordingly, in this implementation, an address identifying the location of a data block on a disk drive may specify a disk, a physical track and a physical block. Storage devices 240 are connected to controller 220, in accordance with this implementation, by Fibre Channel interfaces, SCSI connections, or a combination thereof.

Communications between controller 220 and storage devices 240 are conducted in accordance with SCSI protocols. Accordingly, controller 220 transmits data processing commands to, and receives data from, storage devices 240, in accordance with SCSI protocols.

One implementation by which primary system 130 allocates disk space for storing data is described below as an example. It should be noted, however, that this implementation is for illustrative purposes only and that other techniques for allocating disk space may be used.

Primary system 130 may dynamically allocate disk space according to a technique that assigns disk space to a virtual disk drive as needed. The dynamic allocation technique functions on a drive level. In such instances, disk drives that are managed by primary system 130 are defined as virtual drives. The virtual drive system allows an algorithm to manage a "virtual" disk drive having assigned to it an amount of virtual storage that is larger than the amount of physical storage actually available on a single disk drive. Accordingly, large disk drives can virtually exist on a system without requiring an initial investment of an entire storage subsystem. Additional storage may then be added as it is required without committing these resources prematurely. Alternatively, a virtual disk drive may have assigned to it an amount of virtual storage that is smaller than the amount of available physical storage.

According to this implementation, when primary system 130 initially defines a virtual storage device, or when additional storage is assigned to the virtual storage device, the disk space on the storage devices is divided into segments. Each segment has associated with it segment descriptors, which are stored in a free list table in memory. Generally, a segment descriptor contains information defining the segment it represents; for example, the segment descriptor may define a home storage device location, physical starting sector of the segment, sector count within the segment, and segment number. FIG. 2A illustrates schematically the contents of a segment descriptor 32. Fields 32-1 through 32-5 contain data indicating, respectively, on which storage device the segment is located, the segment's starting physical address, the segment's size, a segment identifier, and other information which may be useful for identifying and processing the segment.

Referring to FIG. 2B, as segments are needed to store data, the next available segment descriptor, e.g., segment descriptor 32, is identified from the free segment list 50, the data is stored in the segment, and the segment descriptor 32 is assigned to a new table called a segment map 66. The segment map 66 maintains information representing how each segment defines the virtual storage device. More specifically, the segment map provides the logical sector to physical sector mapping of a virtual storage device. After the free segment descriptor 32 is moved or stored in the appropriate area of the segment map 66, which in this example is slot 2 (70), the descriptor is no longer a free segment but is now an allocated segment. A detailed description of this method for dynamically allocating disk space can be found in U.S. patent application Ser. No. 10/052,208, entitled "Dynamic Allocation of Computer Memory," filed Jan. 17, 2002, which is incorporated herein by reference in its entirety.

Backup storage system 140 may be implemented by any system capable of storing data generated for the purpose of backing up data stored on primary storage system 130. In the implementation shown in FIG. 1, backup storage system 140 is implemented by a system similar to that of primary system 130. Accordingly, backup system 140 comprises controller 265, interface 260, memory 270, and storage devices 280-1 and 280-2. However, in other implementations, backup storage system 140 is configured in a different manner than primary storage system 130.

In one implementation, controller 265 of backup system 140 and controller 220 of primary system 130 both utilize the dynamic disk space allocation technique described above. Accordingly, when a respective block of data is stored on primary system 130, controller 220 of primary system 130 generates a segment descriptor containing an identifier for the data block. A copy of the respective data block is transmitted to backup system 140 for purposes of backing up the data, and controller 265 of backup system 140 separately generates a segment descriptor for the copied data block. In accordance with this implementation, although the physical location of the respective data block on primary system 130 may be different from the physical location of the copied data block on backup system 140, primary system 130 and backup system 140 use the same segment identifier information for the two respective data blocks. In this way, primary system 130 and backup system 140 can identify and find a given block of data on primary system 130 and the corresponding data block stored on backup system 140.

In accordance with one aspect of the invention, primary system 130 determines whether a first block of data stored on primary system 130 and a corresponding, second block of data stored on backup system 140 are duplicates of one another. To accomplish this, primary system 130 generates a random value R, and transmits the random value and an identifier associated with the first data block to backup system 140. Backup system 140 receives the random value R and the identifier, uses the identifier to retrieve the second block of data, and uses a selected D-G function to generate a digest $D_B$ representing the second block of data. Backup system 140 then uses the digest $D_B$ to encode the random value R, producing an encoded value $V_B$. Backup system 140 transmits the encoded value $V_B$ to primary system 130. Primary system 130 similarly uses the D-G function to derive a digest $D_P$ from the first block of data, and then uses the digest $D_P$ to encode the random value R, generating an encoded value $V_P$. Primary system 130 compares the encoded value $V_B$ (received from backup system 140) to the encoded value $V_P$ to determine whether the two blocks of data are consistent. If the encoded value $V_B$ is equal to the encoded value $V_P$, then the two data blocks are duplicates of one another. If $V_B$ is not equal to $V_P$, then the two data blocks are different. Primary storage system 130 may further utilize this technique to compare multiple blocks of data with a plurality of corresponding data blocks stored on primary storage system 130. It should be noted that, when used herein, any statement that two data blocks are "duplicates" of one another (or that they are "equivalent", or "the same") signifies that the two data blocks are assumed to be the same, within a negligible probability of collision.

The procedure outlined above is referred to as the "reverse challenge-response" method for comparing data. The random value R sent by primary system 130 constitutes a "challenge." The encoded value $V_B$ sent from backup system 140 to primary system 130 represents the "response."

Figure 3A:
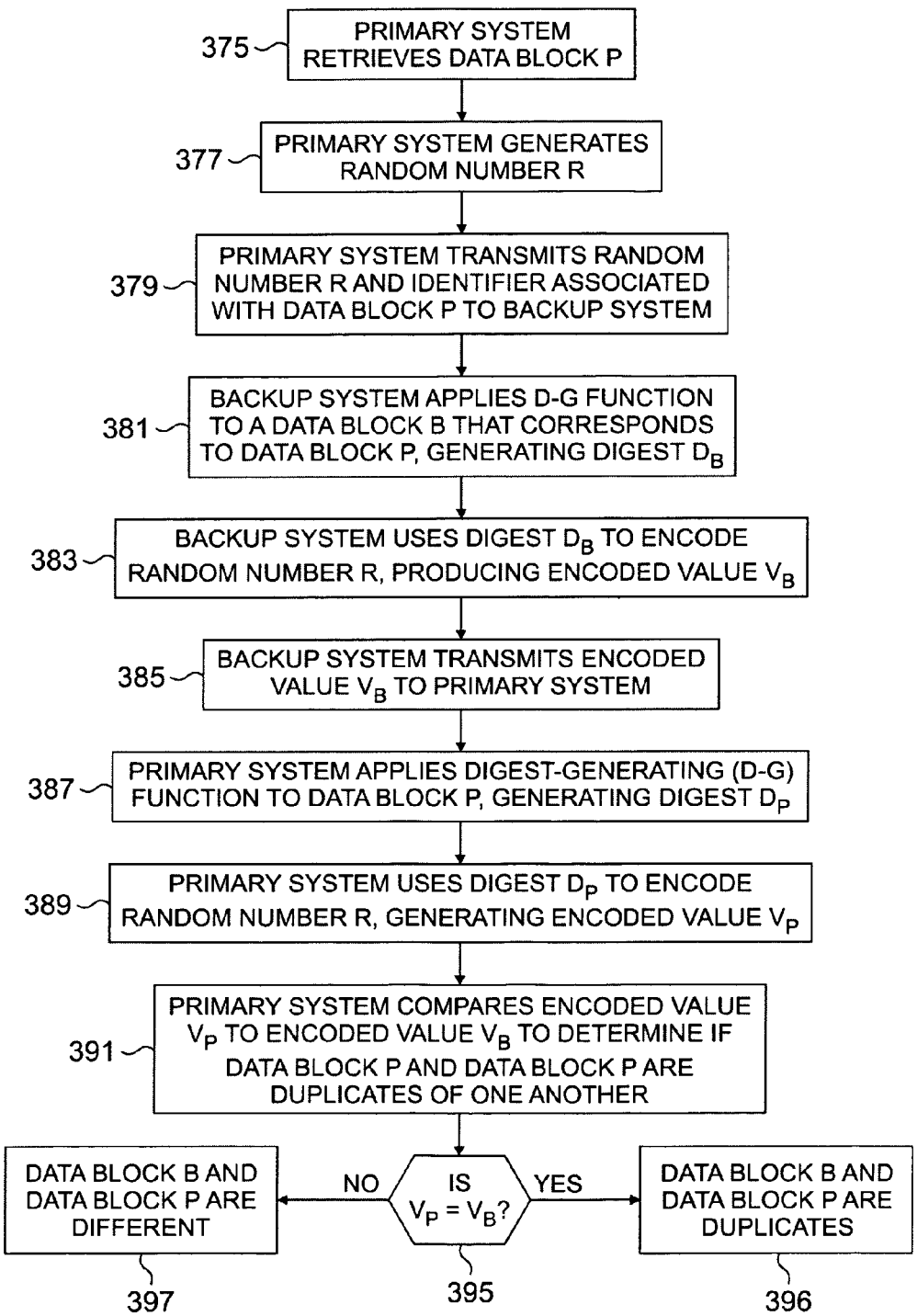
FIG. 3A is a flowchart describing a method for verifying the consistency of two blocks of data in accordance with one implementation of the invention.

FIG. 3A is a flowchart describing a method for verifying the consistency of two blocks of data using the reverse challenge-response technique, in accordance with one implementation of the invention. At step 375, controller 220 of primary system 130 retrieves a selected block of data for verification from one or more of storage devices 240. In this example, a selected block of data stored in primary storage system 130 is referred to as a "data block P." Similarly, a selected block of data stored in backup storage system 140 is referred to as a "data block B." In one implementation in which primary system 130 utilizes the dynamic disk space allocation technique described above, a "block" of data may comprise a segment identified in a segment descriptor, or a portion thereof. In other implementations, a block of data may be defined differently.

At step 377, controller 220 of primary system 130 generates a random value R. In the implementation illustrated in FIG. 3A, the random value R is a random number. The random number may be generated using any well-known random number generator. In one implementation, a random number function supported by C runtime library is employed. Another implementation uses a random number function supported by Java API. In other implementations, a cryptographically strong random number generating algorithm may be employed. Still other implementations employ non-numerical values for R.

Figure 4:
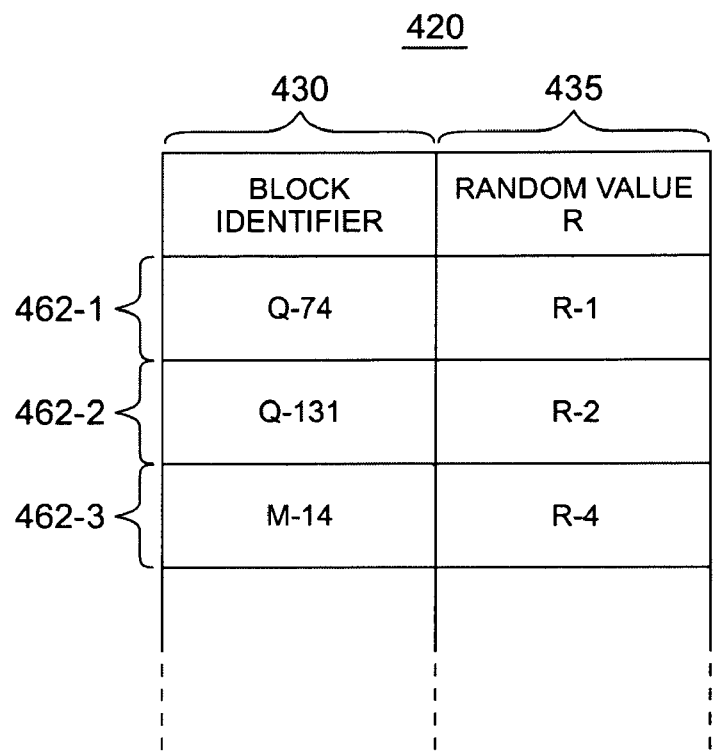
FIG. 4 illustrates schematically a table maintained by a storage system for organizing information pertaining to various blocks of data, in accordance with one implementation of the invention.

To organize the information generated for various blocks of data, controller 220 of primary system 130 may maintain a table such as that shown in FIG. 4. Table 420 contains two columns 430 and 435. Column 430 identifies a respective block of data stored on primary system 130. Column 435 contains a random value for each respective data block. Each row in table 420 constitutes a record associated with a respective block of data. Referring to row 462-1, for example, the data block identified by identifier Q-74 is associated with random value R-1. It should be noted that the identifiers shown in FIG. 4 (e.g., Q-74) are for illustrative purposes. Other implementations may use different forms of identifying information for various blocks of data.

In accordance to one implementation in which the dynamic disk space allocation technique described above is used, a respective data block is identified in database 420 by its segment identifier and, if necessary, additional information indicating a block within the segment. In accordance with this implementation, because a segment identifier identifies a logical unit of data rather than a physical address, both primary system 130 and backup system 140 are capable of utilizing the segment identifier information to locate the appropriate block of data. Referring to FIG. 4, for example, the label Q-74 may identify a logical unit of data which is stored on primary system 130 as well as on backup system 140. In accordance with the dynamic allocation technique, the physical location of the segment in primary system 130 is dynamically determined by controller 220; likewise, the physical location of the segment in backup system 140 is dynamically determined by controller 265. The same identifier may be used by both storage systems to keep track of the respective data blocks.

At step 379, controller 220 of primary system 130 transmits the random value R and an identifier of an associated data block P to backup system 140. In one implementation, primary system 130 sends segment identifier information associated with a data block P, and an associated random value.

Figure 5:
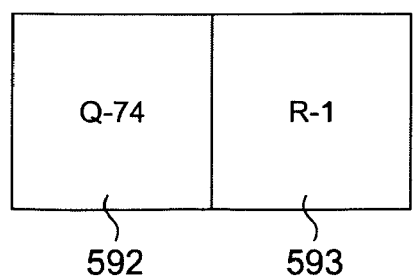
FIG. 5 illustrates schematically a data packet used by a storage system to transmit data pertaining to a single data block, in accordance with one implementation of the invention.

In one implementation, primary system 130 transmits data pertaining to a single data block P using a data packet such as that shown in FIG. 5. Referring to FIG. 5, data packet 590 contains two fields 592–593. Field 592 carries data identifying a data block P. In this example, field 592 contains an identifier for the data block Q-74. Field 593 contains the random value R-1 associated with data block Q-74. It should be noted that although for purposes of illustration, two fields are shown in FIG. 5, packet 590 may comprise any number of fields. In an alternative implementation, primary system 130 may transmit to backup system 140 data for multiple data blocks in the form of a table.

At step 381, controller 265 of backup system 140 applies a D-G function to a data block B that corresponds to the data block P, to generate a digest $D_B$ that represents the data block B. The D-G function may be any operation that generates a digest having a sufficiently high probability of detecting differences between two blocks of data. In accordance with one implementation, the D-G function is known to both the primary and backup storage systems prior to commencing the data synchronization process.

Referring to FIG. 5, controller 265 of backup system 140 receives data packet 590, and retrieves the data block B identified as Q-74. Controller 265 then applies the known D-G function to the data block B to produce the digest $D_B$. To organize data received from primary system 130, controller 265 of backup system 140 may maintain a table similar to table 420 shown in FIG. 4.

In one implementation, the D-G function is a hash function. A hash function performs a transformation on an input and returns a number having a fixed length—a hash value. Properties of a hash function as used in the present invention include the ability to (1) take a variable-sized input and generate a fixed-size output, (2) compute the hash value relatively easily and quickly for any input value, and (3) be substantially (or "strongly") collision-free. Examples of hash functions satisfying these criteria include, but are not limited to, the message digest 5 (MD5) algorithm and the secure hash (SHA-1) algorithm.

The MD5 algorithm generates a 16-byte (128-bit) hash value. It is designed to run on 32-bit computers. MD5 is substantially collision-free. Using MD5, hash values may be typically generated at high speed. The SHA-1 algorithm generates a 20-byte (160-bit) hash value. The maximum input length of a data block to the SHA-1 algorithm is $2^{64}$ bits (~$1.8\times10^{19}$ bits). The design of SHA-1 is similar to that of MD5, but because its output is larger, it is slightly slower than MD5, although it is more collision-free.

At step 383, controller 265 of backup system 140 uses digest $D_B$ to encode the random number R, generating an encoded value $V_B$. The encoding technique should be chosen carefully to minimize the probability of collisions. Accordingly, in one implementation, a hash function is used to encode the random number R. It is preferable to employ an encoding technique that is irreversible, to reduce the possibility that transmitted information may be intercepted. However, in other implementations, a reversible encoding technique may be used. In accordance with the example discussed above, controller 265 of backup system 140 uses the digest $D_B$ derived from the data block identified as Q-74 to encode the random number R-1, generating an encoded value $V_B$-1.

At step 385, controller 265 of backup system 140 transmits the encoded value $V_B$, and an identifier of the associated data block B to primary system 130. In one implementation, backup system 140 transmits the encoded value $V_B$ and data identifying the associated data block B using a data packet similar to that shown in FIG. 5. In accordance with the example provided above, backup system 140 transmits a data packet conveying the identifier for data block Q-74 in one field, and the associated encoded value $V_B$-1 in a separate field.

Primary system 130 receives the data packet and extracts the encoded value $V_B$ and the identifier. Primary system 130 reads the identifier and associates the encoded value $V_B$ with the corresponding data block P.

At this point, primary system 130 proceeds to derive a second encoded value by the same method used by backup system 140. Thus, at step 387, controller 220 of primary system 130 applies the D-G function (known to both the primary and backup systems) to the data block P to generate a digest $D_P$. In an implementation in which a hash function is used to generate digests, the digest $D_P$ generated by primary system 130 is of the same length as the digest $D_B$ generated by backup system 140.

At step 389, controller 220 of primary system 130 uses the digest $D_P$ to encode the random value R associated with the data block P, producing an encoded value $V_P$. Controller 220 of primary system 130 utilizes the same encoding technique used by backup system 140 to generate encoded value $V_B$. In an implementation in which a hash value is used by backup system 140 to generate the encoded value $V_B$, the same hash function is utilized by primary system 130 to produce the encoded value $V_P$. Following the example discussed above, controller 220 of primary system 130 uses the digest $D_P$ to encode the random number R-1, generating the encoded value $V_P$-1.

Figures 6, 7:
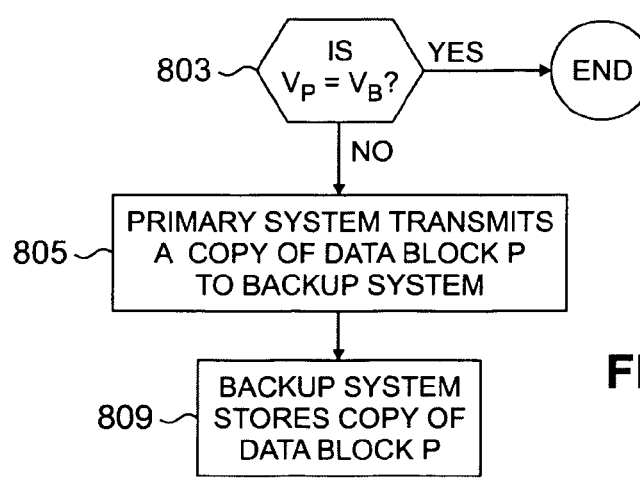
FIG. 6 illustrates schematically a table maintained by a storage system for organizing information pertaining to various blocks of data, in accordance with one implementation of the invention.
FIG. 7 is a flowchart depicting a method for synchronizing data in accordance with one aspect of the invention.

To organize the information associated with various blocks of data, primary system 130 may maintain a table such as that shown in FIG. 6. Table 620 contains three columns 630, 635 and 640. Column 630 identifies a respective block of data stored on primary system 130. Column 635 contains an encoded value $V_B$ received from backup system 140 that is associated with a respective data block. Column 640 stores an encoded value $V_P$ generated by primary system 130. Each row in table 620 constitutes a record associated with a respective block of data. Referring to row 662-1, for example, the data block identified as Q-74 is associated with encoded values $V_B$-1 and $V_P$-1.

At step 391, controller 220 of primary system 130 compares the encoded value $V_B$ received from backup system 140 with the associated encoded value $V_P$. If it is determined, at block 395, that the encoded value $V_P$ equals encoded value $V_B$, then data block P and data block B are duplicates of one another (step 396). If $V_P$ is not equal to $V_B$, then data block P and data block B are different (step 397).

Figure 3B:
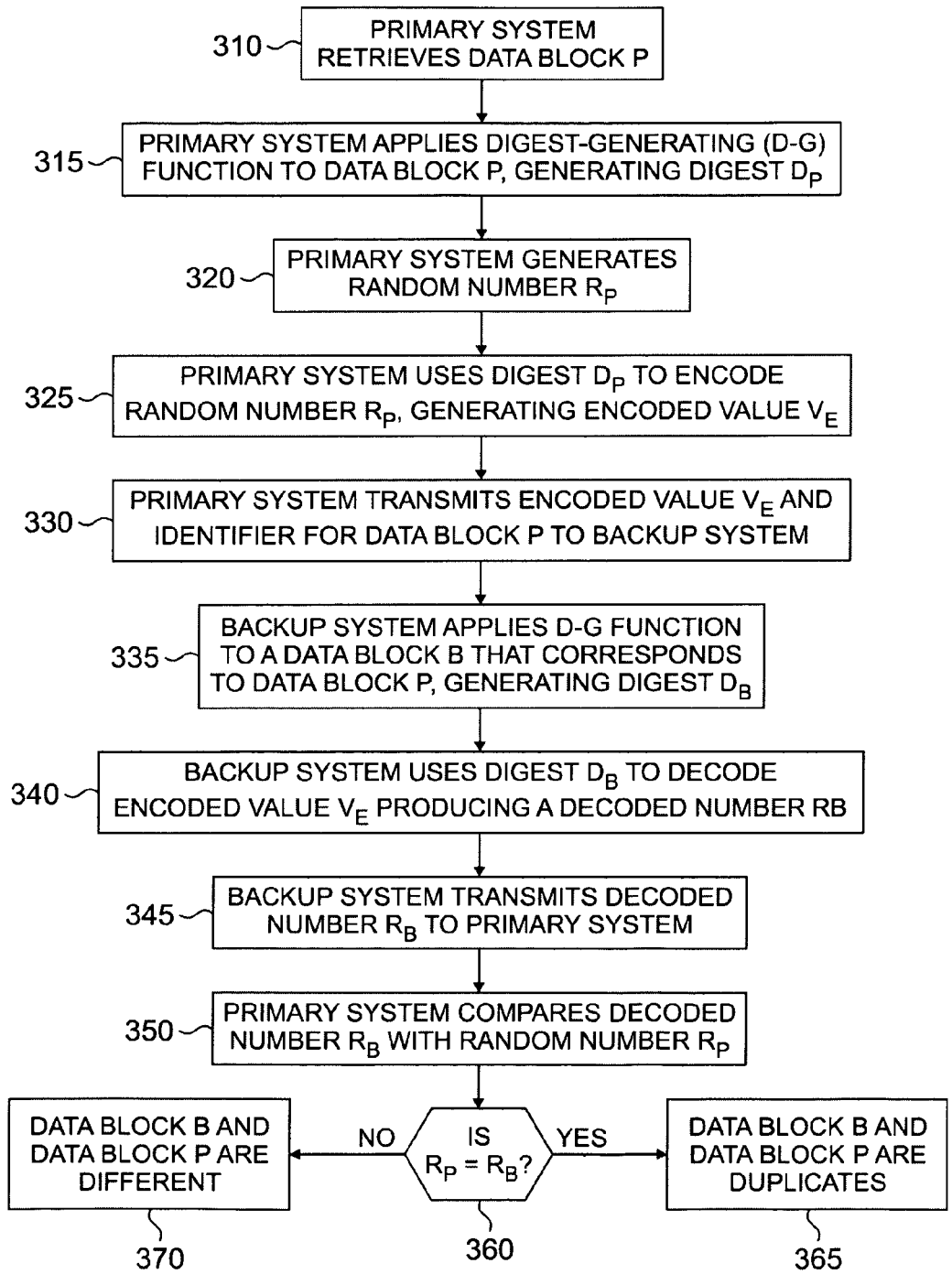
FIG. 3B is a flowchart describing a method for verifying the consistency of two blocks of data in accordance with an alternative implementation of the invention.

FIG. 3B is a flowchart illustrating a method for verifying the consistency of two data blocks using the reverse challenge-response method, in accordance with an alternative implementation of the invention. Referring to FIG. 3B, at step 310, primary system 130 retrieves a data block P. At step 315, primary system 130 applies a D-G function to the data block P, generating a digest $D_P$. In one implementation, primary system 130 uses a hash function to generate the digest $D_P$. At step 320, primary system 130 generates a random number $R_P$.

At step 325, primary system 130 uses the digest $D_P$ to encode the random number $R_P$, producing an encoded value $V_E$. At step 330, primary system 130 transmits the encoded value $V_E$ and an identifier for the data block P to backup system 140.

At step 335, backup system 140 applies the known D-G function to a data block B that corresponds to the data block P, generating a digest $D_B$. At step 340, backup system 140 uses the digest $D_B$ to decode the encoded value $V_E$, producing a decoded number $R_B$, and transmits the decoded number $R_B$ to primary system 130 (step 345).

At step 350, primary system 130 compares the decoded number $R_B$ to the random number $R_P$ to determine whether the data block B is a duplicate of the data block P. Referring to block 360, if $R_P$ is equivalent to $R_B$, then the two data blocks are duplicates of one another (block 365). If $R_P$ and $R_B$ are not the same, the two data blocks are different (block 370).

In accordance with another aspect of the invention, primary system 130 transmits to backup system 140 a copy of a data block P that is inconsistent with the corresponding data block B. FIG. 7 is a flowchart depicting a method for synchronizing data in accordance with this aspect of the invention. This is accomplished by ascertaining values $V_P$ and $V_B$ for one or more corresponding blocks of data as described above with reference to FIG. 3A. Referring to block 803, if the encoded value $V_P$ is equal to encoded value $V_B$, then the process ends. If multiple data blocks are being examined, primary system 130 may at this point proceed to another data block.

If, however, the encoded value $V_P$ is not equal to the encoded value $V_B$, then, at step 805, controller 220 of primary system 130 transmits a copy of the data block P associated with the value $V_P$ to backup system 140. At step 809, controller 265 of backup system 140 stores the copy of the data block P, thus ensuring that the data in the two systems are synchronized. Referring to FIG. 6 as an example, if the encoded value $V_P$-1 and the encoded value $V_B$-1 are not equal, then the data block Q-74 on primary system 130 and the data block Q-74 on backup system are different. In this case, controller 220 of primary system 130 transmits a copy of the contents of the data block P identified as Q-74, and backup system 140 stores the copied data block. In one implementation, backup system 140 overwrites the existing data block B identified as Q-74.

It should be noted that, although in the implementations described above, primary system 130 initiates the process of comparing two data blocks, by retrieving a data block P, generating a random number R, etc., in another implementation this role may be performed by backup storage system 140. In accordance with this implementation, backup system 140 retrieves a data block B and generates a random value R, and transmits the random value R to primary system 130. Primary system 130 retrieves a corresponding block P, generates a first digest, uses the first digest to encode the random value R, and transmits a first encoded value back to backup system 140. Backup system 140 derives a second digest from the data block B, and uses the second digest to encode the random value R to produce a second encoded value. According to this implementation, backup system 140 compares the first encoded value to the second encoded value to determine if the data block B and the data block P are the same. If the first encoded value is equivalent to the second encoded value, the data block B is a duplicate of the data block P. If the first encoded value is not the same as the second encoded value, the data block B is different from the data block P. In accordance with this implementation, if the data blocks are different, backup system 140 may transmit a copy of the data block B to primary system 130. After receiving a copy of the data block B from backup system 140, primary system 130 stores the copied data block.

It should be further noted that, although in the implementations described above, digests are generated by hash functions, other D-G functions may be employed. For example, in an alternative implementation, the cyclic redundancy check (CRC) may be used to generate a digest.

SCSI Command

In accordance with another aspect of the invention, a primary storage system transmits to a backup storage system, in accordance with standard protocols, a message directing a backup storage system to perform a synchronization operation with respect to a specified block of data. Specifically, the primary system transmits a message conveying a random value and an identifier for a respective block of data. The message further represents a request that the backup storage system apply a known D-G function to the respective block of data to generate a digest, utilize the digest to encode the random value, and send back to the primary system an encoded value. Such a message is referred to as a "reverse challenge-response request." In response to the request, the backup system applies the known D-G function to the respective block of data to generate a digest, utilizes the digest to encode the random value, and sends the resulting encoded value back to the primary system.

In accordance with one implementation, the reverse challenge-response request is implemented as a Small Computer System Interface (SCSI) command. SCSI is a standard for connecting computers to peripheral devices such as disk drives. The SCSI standard specifies the hardware and software interface between these devices at a level that minimizes dependencies on any specific hardware implementation. This is achieved by representing data stored on a storage device as a collection of logical blocks rather than in terms of the data's physical address. This abstraction allows the SCSI protocol to be used with a wide variety of devices.

The central item of hardware in a SCSI system is the SCSI bus, which must conform to the specification of the SCSI standard. A SCSI device refers to any device that is connected to the SCSI bus. Each SCSI device on the bus is assigned a SCSI ID that uniquely identifies the device during SCSI transactions.

The SCSI standard also establishes a set of protocols by which SCSI devices may communicate. When two SCSI devices communicate, one device acts as the initiator and the other as the target. The initiator begins a transaction by selecting a target device. The target responds to the selection and requests a command. The initiator then sends a SCSI command, and the target performs the action.

Figure 8:
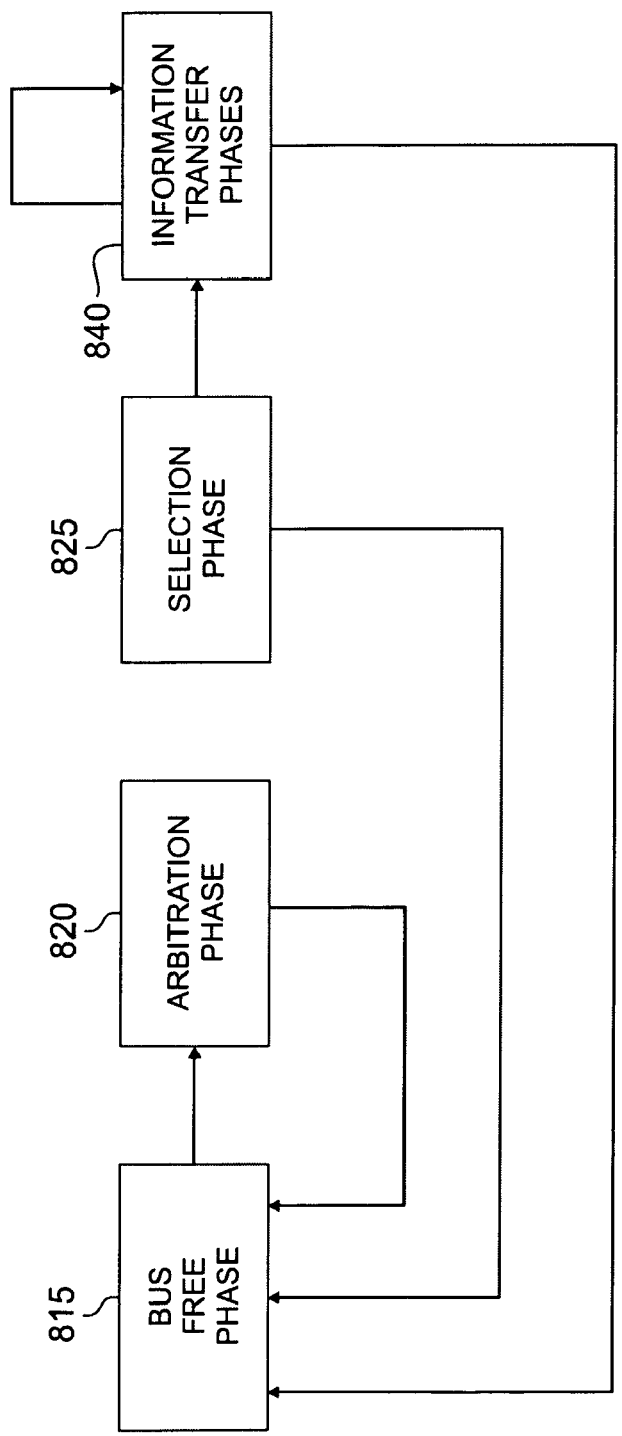
FIG. 8 is a block diagram showing the relationship of SCSI bus phases.

SCSI transactions comprise up to eight distinct phases: bus free, arbitration, selection, reselection, command, data, status and message. FIG. 8 is a block diagram showing the relationship of the SCSI bus phases. The bus free phase 815 indicates that no SCSI devices are using the SCSI bus. During arbitration phase 820, a SCSI device may gain control of the SCSI bus. All devices requesting to use the bus assert their SCSI ID by transmitting a signal onto the bus. The device having the highest ID wins the arbitration and becomes the initiator for the next SCSI transaction. During selection phase 825, the initiator selects a target device. The optional reselection phase (not shown) allows a peripheral that is busy performing a lengthy data processing action to disconnect from and subsequently reconnect to the SCSI bus.

The last four phases (command, data, status and message) are referred to collectively as the information transfer phases, and are represented in FIG. 8 by block 840. During these phases, data can be transferred between the initiator and target devices. During the command phase, the target requests a command from the initiator, and in response, the initiator transfers a SCSI command to the target. A SCSI command is an instruction from an initiator to a target to perform an action, such as reading or writing a block of data. SCSI commands are contained in a data structure called a command descriptor block, which can be 6, 10 or 12 bytes in size. The first byte specifies the action requested, and the remaining bytes are parameters used for that action. The target can determine from the first command byte transmitted how many command bytes will follow.

During the data phase, data is transferred between the initiator and the target. To indicate that it is ready to transmit data to the initiator, the target transmits an input/output (I/O) signal indicating DATA IN. To indicate that it is ready to receive data, the target transmits a DATA OUT signal.

During the message phase, the target requests the transfer of a message. The SCSI standard specifies a number of possible messages that may be exchanged between SCSI devices. SCSI messages must conform to the structure specified by the SCSI standard and generally carry information about a SCSI transaction. The status phase occurs after completion of all commands and allows the target to transmit a status signal to the initiator. For example, the target may send status information indicating that an operation completed successfully, or that an error occurred. After a transaction is completed, the bus returns to the bus free phase 815.

According to this implementation, a primary storage system, in the role of initiator, sends to a backup storage system, acting as target, a SCSI command representing a reverse challenge-response request. The SCSI command conveys a random value and an identifier for a respective block of data, and directs the backup storage system to apply a known D-G function to the respective block of data to generate a digest, utilize the digest to encode the random value, and send back to the primary system an encoded value. In response, the backup system applies the known D-G function to the respective block of data, generating a digest, utilizes the digest to encode the random value, and sends to the primary system the resulting encoded value.

Figure 9:
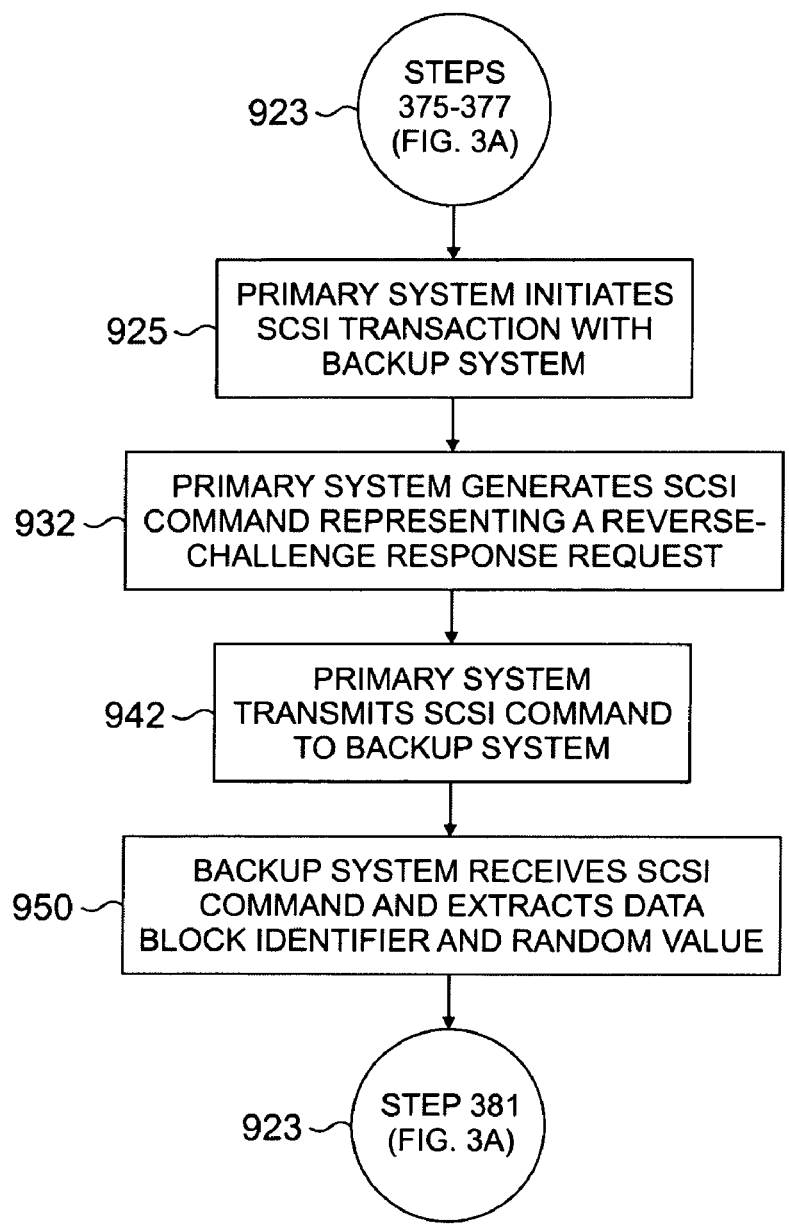
FIG. 9 is a flowchart showing a method for transmitting to a backup storage system a SCSI command representing a reverse challenge response request, in accordance with one aspect of the invention.

FIG. 9 is a flowchart showing a method for transmitting to a backup storage system a SCSI command representing a reverse challenge-response request. Referring to block 923, controller 220 of primary system 130 first performs steps 375–377 depicted in FIG. 3A. Accordingly, controller 220 retrieves a data block P, and generates a random number R.

At step 925, controller 220 of primary storage system 130 initiates a SCSI transaction with backup storage system 140. Referring to FIG. 8, controller 220 arbitrates to use a SCSI bus in arbitration phase 820 and selects backup system 140 as the target device in selection phase 825. In another implementation, controller 220 (of primary system 130) selects controller 265 (of backup system 140) as the target. Alternatively, controller 220 selects a storage device (e.g., 280-1) as the target.

Returning to FIG. 9, at step 932, controller 220 of primary system 130 generates a SCSI command that represents a reverse challenge-response request. In accordance with this implementation, a customer-defined SCSI command is utilized. Accordingly, primary system 130 generates a command descriptor block (CDB) of 6, 10 or 12 bytes in size. The CDB includes an identifier of a respective data block P stored in primary system 130 and the random value R.

At step 942, controller 220 of primary system 130 transmits the SCSI command over network 120 to backup system 140. Referring to FIG. 8, primary system 130 transmits the SCSI command to backup system 140 during the command phase, which occurs during information transfer phases 840.

At step 950, controller 265 of backup system 140 receives the SCSI command and extracts the identifier for a respective data block P stored in primary system 130, and the random value R. Referring to block 952, the interaction between backup system 140 and primary system 130 then proceeds as described previously, starting at step 381 of FIG. 3A. Accordingly, controller 265 of backup system 140 applies the known D-G function to a corresponding data block B to generate a digest $D_B$, uses the digest $D_B$ to encode the random value R and produce an encoded value $V_B$, and transmits the encoded value $V_B$ back to primary system 140. In the same manner as described above, controller 220 of primary system 130 then generates a digest $D_P$ that represents the data block P, and uses the digest $D_P$ to encode the random value R, generating an encoded value $V_P$. Controller 220 of primary system 130 compares the encoded value $V_P$ with the encoded value $V_B$ to determine whether the two data blocks are duplicates of one another.

It should be noted that, although in the implementations described above, primary system 130 initiates the process of synchronizing two data blocks, by transmitting a SCSI command, in accordance with another implementation this role may be performed by backup storage system 140. In accordance with this implementation, backup system 140 generates and transmits to primary system 130 a command representing a reverse challenge-response request. The command conveys an random value and identifies a respective block of data. In response to the request, primary system 130 applies the known D-G function to a corresponding block of data to generate a digest, utilizes the digest to encode the random value, and sends the resulting encoded value back to backup system 140. In the manner described above, backup system 140 derives a second digest from a corresponding data block, uses the second digest to encode the random value, generating a second encoded value, and compares the two encoded values to determine whether the two data blocks are duplicates of one another.

We claim:

1. A method for comparing a first unit of data stored in a first storage system and a second unit of data stored in a second storage system, comprising:
    generating a first digest that represents the first unit of data;
    deriving a first encoded value using the first digest and a predetermined value;
    generating a second digest that represents the second unit of data;
    deriving a second encoded value using the second digest and the predetermined value; and
    determining whether the first unit of data and the second unit of data are duplicates of one another by comparing the first encoded value and the second encoded value.

2. The method of claim 1, wherein the predetermined value is a random value.

3. The method of claim 1, wherein the first digest and the second digest are generated using a hash function.

4. The method of claim 1, wherein the first digest and the second digest are generated using a cyclic redundancy check.

5. The method of claim 1, wherein the predetermined value is transmitted from the first storage system to the second storage system in a command to encode the predetermined value using the second digest.

6. The method of claim 5, wherein the command is transmitted in accordance with SCSI protocols.

7. The method of claim 6, wherein the command comprises instructions contained in a SCSI command descriptor block.

8. The method of claim 1, further comprising:
    sending a copy of the first unit of data from the first storage system to the second storage system, and storing the copy in the second storage system, if the first unit of data is determined to be different from the second unit of data.

9. The method of claim 1, further comprising storing a copy of at least one of the first unit of data and the second unit of data, if the first unit of data is determined to be different from the second unit of data.

10. A method for comparing a first unit of data stored in a first storage system and a second unit of data stored in a second storage system, comprising:
    generating an initial value associated with the first unit of data;
    transmitting the initial value from the first storage system to the second storage system;
    generating a first digest that represents the second unit of data;
    deriving a first encoded value using the first digest and the initial value;
    transmitting the first encoded value from the second storage system to the first storage system;
    generating a second digest that represents the first unit of data;
    deriving a second encoded value using the second digest and the initial value; and
    determining whether the first unit of data and the second unit of data are duplicates of one another by comparing the first encoded value and the second encoded value.

11. The method of claim 10, wherein at least one of the first storage system and the second storage system is a block-level storage system.

12. The method of claim 10, wherein the first digest and the second digest are generated using a hash function.

13. The method of claim 12, wherein the hash function is a message digest 5 algorithm.

14. The method of claim 12, wherein the hash function is a secure hash algorithm.

15. The method of claim 10, wherein the first digest and the second digest are generated using a cyclic redundancy check.

16. The method of claim 10, wherein the first storage system and the second storage system communicate over a network.

17. The method of claim 16, wherein the network is an intranet.

18. The method of claim 16, wherein the network is a local area network.

19. The method of claim 16, wherein the network is a wide area network.

20. The method of claim 16, wherein the network is an internet.

21. The method of claim 16, wherein the network is a storage area network.

22. The method of claim 16, wherein the network is an Ethernet.

23. The method of claim 10, wherein the initial value is transmitted in a command to encode the initial value using the first digest that represents the second unit of data.

24. The method of claim 23, wherein the command is transmitted in accordance with SCSI protocols.

25. The method of claim 24, wherein the command comprises instructions contained in a SCSI command descriptor block.

26. A method for synchronizing a first unit of data stored in a first storage system and a second unit of data stored in a second storage system, comprising:
    generating an initial value associated with the first unit of data;
    transmitting the initial value from the first storage system to the second storage system;
    generating a first digest that represents the second unit of data;
    deriving a first encoded value using the first digest and the initial value;
    transmitting the first encoded value from the second storage system to the first storage system;
    generating a second digest that represents the first unit of data;
    deriving a second encoded value using the second digest and the initial value;
    determining whether the first unit of data and the second unit of data are duplicates of one another by comparing the first encoded value and the second encoded value; and
    sending a copy of the first unit of data from the first storage system to the second storage system, and storing the copy in the second storage system, if the first unit of data is determined to be different from the second unit of data.

27. The method of claim 26, wherein at least one of the first storage system and the second storage system is a block-level storage system.

28. The method of claim 26, wherein the first digest and the second digest are generated using a hash function.

29. The method of claim 28, wherein the hash function is a message digest 5 algorithm.

30. The method of claim 28, wherein the hash function is a secure hash algorithm.

31. The method of claim 26, wherein the first digest and the second digest are generated using a cyclic redundancy check.

32. The method of claim 26, wherein the first storage system and the second storage system communicate over a network.

33. The method of claim 32, wherein the network is an intranet.

34. The method of claim 32, wherein the network is a local area network.

35. The method of claim 32, wherein the network is a wide area network.

36. The method of claim 32, wherein the network is an internet.

37. The method of claim 32, wherein the network is a storage area network.

38. The method of claim 32, wherein the network is an Ethernet.

39. The method of claim 26, wherein the initial value is transmitted in a command to encode the initial value using the first digest that represents the second unit of data.

40. The method of claim 39, wherein the command is transmitted in accordance with SCSI protocols.

41. The method of claim 40, wherein the command comprises instructions contained in a SCSI command descriptor block.

42. A method for backing up a first unit of data stored on a first storage system, comprising:
generating an initial value associated with the first unit of data;
transmitting the initial value from the first storage system to a second storage system;
generating a first digest that represents a second unit of data stored on the second storage system;
deriving a first encoded value using the first digest and the initial value;
transmitting the first encoded value from the second storage system to the first storage system;
generating a second digest that represents the first unit of data;
deriving a second encoded value using the second digest and the initial value;
determining whether the first unit of data and the second unit of data are duplicates of one another by comparing the first encoded value and the second encoded value; and
storing a copy of at least one of the first unit of data and the second unit of data, if the first unit of data is determined to be different from the second unit of data.

43. A system for comparing a first unit of data stored in a first storage system and a second unit of data stored in a second storage system, comprising:
a first controller for generating a first digest that represents the first unit of data, and for deriving a first encoded value using the first digest and a predetermined value; and
a second controller for generating a second digest that represents the second unit of data, and for deriving a second encoded value using the second digest and the predetermined value;
wherein the second controller determines whether the first unit of data and the second unit of data are duplicates of one another by comparing the first encoded value and the second encoded value.

44. The system of claim 43, wherein the predetermined value is a random value.

45. The system of claim 43, wherein the first digest and the second digest are generated using a hash function.

46. The system of claim 43, wherein the first digest and the second digest are generated using a cyclic redundancy check.

47. The system of claim 43, further comprising an interface for transmitting the predetermined value from the first storage system to the second storage system in a command to encode the predetermined value using the second digest.

48. The system of claim 47, wherein the command is transmitted in accordance with SCSI protocols.

49. The system of claim 48, wherein the command comprises instructions contained in a SCSI command descriptor block.

50. The system of claim 43, further comprising an interface for sending a copy of the first unit of data from the first storage unit system to the second storage, and a memory for storing the copy in the second storage system, if the first unit of data is determined to be different from the second unit of data.

51. The system of claim 43, further comprising a memory for storing a copy of at least one of the first unit of data and the second unit of data, if the first unit of data is determined to be different from the second unit of data.

52. A system for comparing a first unit of data stored in a first storage system and a second unit of data stored in a second storage system, comprising:
a first controller for generating an initial value associated with the first unit of data;
a first interface for transmitting the initial value from the first storage system to the second storage system;
a second controller for generating a first digest that represents the second unit of data, and for deriving a first encoded value using the first digest and the initial value; and
a second interface for transmitting the first encoded value from the second storage system to the first storage system;
wherein, the first controller generates a second digest that represents the first unit of data, derives a second encoded value using the second digest and the initial value, and determines whether the first unit of data and the second unit of data are duplicates of one another by comparing the first encoded value and the second encoded value.

53. The system of claim 52, wherein at least one of the first storage system and the second storage system is a block-level storage system.

54. The system of claim 52, wherein the first digest and the second digest are generated using a hash function.

55. The system of claim 54, wherein the hash function is a message digest 5 algorithm.

56. The system of claim 54, wherein the hash function is a secure hash algorithm.

57. The system of claim 52, wherein the first digest and the second digest are generated using a cyclic redundancy check.

58. The system of claim 52, wherein the first storage system and the second storage system communicate over a network.

59. The system of claim 58, wherein the network is an intranet.

60. The system of claim 58, wherein the network is a local area network.

61. The system of claim 58, wherein the network is a wide area network.

62. The system of claim 58, wherein the network is an internet.

63. The system of claim 58, wherein the network is a storage area network.

64. The system of claim 58, wherein the network is an Ethernet.

65. The system of claim 52, wherein first interface transmits the initial value in a command to encode the initial value using the first digest that represents the second unit of data.

66. The system of claim 65, wherein the command is transmitted in accordance with SCSI protocols.

67. The system of claim 66, wherein the command comprises instructions contained in a SCSI command descriptor block.

68. A system for synchronizing a first unit of data stored in a first storage system and a second unit of data stored in a second storage system, comprising:
- a first controller for generating an initial value associated with the first unit of data;
- a first interface for transmitting the initial value from the first storage system to the second storage system;
- a second controller for generating a first digest that represents the second unit of data, and for deriving a first encoded value using the first digest and the initial value; and
- a second interface for transmitting the first encoded value from the second storage system to the first storage system;
- wherein, the first controller generates a second digest that represents the first unit of data, derives a second encoded value using the second digest and the initial value, and determines whether the first unit of data and the second unit of data are duplicates of one another by comparing the first encoded value and the second encoded value, and the first controller sends a copy of the first unit of data from the first storage system to the second storage system, the copy being stored in a memory in the second storage system, if the first unit of data is determined to be different from the second unit of data.

69. The system of claim 68, wherein at least one of the first storage system and the second storage system is a block-level storage system.

70. The system of claim 68, wherein the first digest and the second digest are generated using a hash function.

71. The system of claim 70, wherein the hash function is a message digest 5 algorithm.

72. The system of claim 70, wherein the hash function is a secure hash algorithm.

73. The system of claim 68, wherein the first digest and the second digest are generated using a cyclic redundancy check.

74. The system of claim 68, wherein the first storage system and the second storage system communicate over a network.

75. The system of claim 74, wherein the network is an intranet.

76. The system of claim 74, wherein the network is a local area network.

77. The system of claim 74, wherein the network is a wide area network.

78. The system of claim 74, wherein the network is an internet.

79. The system of claim 74, wherein the network is a storage area network.

80. The system of claim 74, wherein the network is an Ethernet.

81. The system of claim 68, wherein the first interface transmits the initial value in a command to encode the initial value using the first digest that represents the second unit of data.

82. The system of claim 81, wherein the command is transmitted in accordance with SCSI protocols.

83. The system of claim 82, wherein the command comprises instructions contained in a SCSI command descriptor block.

84. A system for backing up a first unit of data stored on a first storage system, comprising:
- a first controller for generating an initial value associated with the first unit of data;
- a first interface for transmitting the initial value from the first storage system to a second storage system;
- a second controller for generating a first digest that represents a second unit of data stored on the second storage system, and for deriving a first encoded value using the first digest and the initial value; and
- a second interface for transmitting the first encoded value from the second storage system to the first storage system;
- wherein, the first controller generates a second digest that represents the first unit of data, derives a second encoded value using the second digest and the initial value, and determines whether the first unit of data and the second unit of data are duplicates of one another by comparing the first encoded value and the second encoded value, a copy of at least one of the first unit of data and the second unit of data being stored in a memory, if the first unit of data is determined to be different from the second unit of data.

* * * * *